(12) United States Patent
Lee et al.

(10) Patent No.: US 8,360,884 B2
(45) Date of Patent: Jan. 29, 2013

(54) APPARATUS AND METHOD FOR PROVIDING ADAPTIVE BROADCAST SERVICE USING GAME METADATA

(75) Inventors: Hee-Kyung Lee, Daejeon (KR); Jung-Won Kang, Seoul (KR); Jae-Gon Kim, Daejeon (KR); Jin-Woo Hong, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1459 days.

(21) Appl. No.: 11/813,454

(22) PCT Filed: Jan. 6, 2006

(86) PCT No.: PCT/KR2006/000063
§ 371 (c)(1),
(2), (4) Date: Jul. 6, 2007

(87) PCT Pub. No.: WO2006/073283
PCT Pub. Date: Jul. 13, 2006

(65) Prior Publication Data
US 2008/0132337 A1    Jun. 5, 2008

(30) Foreign Application Priority Data
Jan. 7, 2005    (KR) .................. 10-2005-0001861

(51) Int. Cl.
*A63F 9/24*    (2006.01)
(52) U.S. Cl. ................ 463/40; 463/42; 705/51
(58) Field of Classification Search .......... 463/40, 463/42; 705/51
See application file for complete search history.

(56) References Cited

U.S. PATENT DOCUMENTS

| 2002/0087403 | A1 | 7/2002 | Meyers et al. |
| 2003/0177503 | A1* | 9/2003 | Sull et al. .................. 725/112 |
| 2007/0191108 | A1* | 8/2007 | Brunet De Courssou et al. .................... 463/42 |

(Continued)

FOREIGN PATENT DOCUMENTS

| EP | 1 003 304 A1 | 5/2000 |
| EP | 1 462 999 A2 | 9/2004 |

(Continued)

OTHER PUBLICATIONS

"Broadcast and On-line Services: Search, Select and Rightful Use of Content on Personal Storage Systems (TV-Anytime Phase 1); Part 7: Bi-directional Metadata Delivery Protection", ETSI TS 102 822-7 V.1.1.1, Oct. 2003; 19 pages.

(Continued)

*Primary Examiner* — Pierre E Elisca
(74) *Attorney, Agent, or Firm* — Ladas & Parry LLP

(57) ABSTRACT

Provided are an apparatus and method for providing an adaptive broadcast service for providing adaptive broadcasting contents including game contents to a user terminal of a home network environment by using game metadata, and an adaptive broadcasting system where a user or a terminal can properly select and consume a game based on the object by defining the metadata for describing the common characteristic of the predetermined contents type including the game and the metadata for describing the characteristic of only the game contents. The apparatus includes: a contents providing unit for publishing and providing the adaptive broadcasting contents including the game contents, and the game metadata to the user terminal; and a contents searching unit for providing contents identification information corresponding to a search and selection signal transmitted from the user terminal, wherein the game metadata describe characteristics of the game contents.

46 Claims, 6 Drawing Sheets

U.S. PATENT DOCUMENTS

| | | | |
|---|---|---|---|
| 2008/0132337 A1* | 6/2008 | Lee et al. | 463/42 |
| 2008/0133464 A1 | 6/2008 | Shin | |
| 2010/0005070 A1 | 1/2010 | Moriya et al. | |
| 2010/0273553 A1* | 10/2010 | Zalewski | 463/31 |
| 2012/0120317 A1* | 5/2012 | Lee et al. | 348/564 |

FOREIGN PATENT DOCUMENTS

| | | |
|---|---|---|
| JP | 2002-033725 A | 1/2002 |
| JP | 2003-018579 | 1/2003 |
| KR | 1020040010314 A | 1/2004 |
| KR | 10-2004-0090836 | 10/2004 |
| KR | 1020040108726 A | 12/2004 |
| WO | 99/59290 A1 | 11/1999 |
| WO | WO 2004/047433 | 6/2004 |
| WO | WO 2004/081807 | 9/2004 |

OTHER PUBLICATIONS

"Broadcast and On-line Services: Search, Select and Rightful Use of Content on Personal Storage Systems (TV-Anytime); Part 5: Rights Management and Protection (RMP) Sub-part 1: Information for Broadcast Applications", ETSI TS 102 822-5-1 V.1.2.1, Jan. 2006; 30 pages.

"Broadcast and On-line Services: Search, Select and Rightful Use of Content on Personal Storage Systems (TV-Anytime); Part 5: Rights Management and Protection (RMP) Sub-part 2: RMPI Binding", ETSI TS 102 822-5-2 V1.2.1, Jan. 2006; 18 pages.

* cited by examiner

APPARATUS AND METHOD FOR PROVIDING ADAPTIVE BROADCAST SERVICE USING GAME METADATA

TECHNICAL FIELD

The present invention relates to an adaptive broadcast system using game metadata; and, more particularly, to an apparatus for providing an adaptive broadcast service using game metadata to provide adaptive broadcasting contents including game contents to a user terminal of a home network environment, and a method thereof.

BACKGROUND ART

As broadcasting is digitalized, broadcasting environments are rapidly changing from conventional unidirectional broadcasting into complex forms such as accommodation of diverse reception terminals through a linkage between a broadcasting network and a communication network as well as multimedia and multi-channels. Also, increasing number of viewers who used to inactively receive broadcasting programs in a limited range of channels, want to directly participate in a broadcasting service or receive/watch desired programs at desired time.

It can be summarized that the broadcasting environments evolve into complexly and diversely personalized forms. In the complex, diverse and new broadcasting environments, an adaptive broadcasting makes it possible for the viewers to conveniently and efficiently consume desired broadcasting contents in form which fits to the preferences of the viewer at desirable time with diverse terminals. That is, the adaptive broadcasting provides adaptive broadcasting contents, which fit to a usage environment including user preference, terminal performance, network characteristics and a natural environment such as time, place and user's feeling.

The TV-Anytime forum is a group for defining a standard for the adaptive broadcasting. The TV-Anytime forum is a private standard organization established in September 1999 to develop a standard for providing services related to audio and visual in a user environment having a Personal Digital Recorder (PDR).

The standard for the adaptive broadcasting in the TV-Anytime forum is divided into a phase 1, i.e., TVA-1 and a phase 2, i.e., TVA-2, in consideration of an assumed system environment and major functions to be provided.

The TVA-1 is for providing application services such as search, selection, acquisition and consumption of audio/video (AV) contents based on Personal Digital Recorder (PDR) in an environment where a main broadcasting program is transmitted through a unidirectional broadcasting channel and additional metadata can be acquired through a bi-directional network.

The metadata means descriptive data for contents such as a program title, genre and overview, and they are generally defined as data about data.

The TVA-2 extends the consumption environment of the TVA-1 assuming the unidirectional broadcasting channel and the bi-directional network. It provides a package, which can be identified and acquired as one selection unit, by integrating diverse forms of media components such as an application program, an advertisement, an image, syntax as well as an AV program, which is an important service object of the TVA-1 in a home network environment.

The package describes information on the package and its components, and provides a targeting function for selecting components from the package based on the consumption environment and user preference and a synchronizing function for accurate consumption through description on temporal/spatial relationships.

However, there is a problem that a game is not included in contents types of components of packages suggested until now. Therefore, it is required to add games to the packages as a new contents type to follow a tendency that importance of the game remarkably increases in a user environment. Accordingly, it is required to define game metadata for describing a game and realize an adaptive broadcasting system using the game metadata.

DISCLOSURE

Technical Problem

It is, therefore, an object of the present invention to define metadata for describing common characteristics of contents types including a game and metadata for describing characteristics of game contents.

It is another object of the present invention to provide an adaptive broadcasting service providing apparatus that makes a user or a user terminal can select and consume a game based on the object by defining the metadata for describing common characteristics of any contents type including the game and the metadata for describing only the characteristics of the game contents.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided an adaptive broadcasting service providing apparatus for providing adaptive broadcasting contents including game contents to a user terminal by using game metadata, the apparatus including: a contents providing means for publishing and providing the adaptive broadcasting contents including the game contents, and the game metadata to the user terminal; and a contents searching means for providing contents identification information corresponding to a search and selection signal transmitted from the user terminal, wherein the game metadata describes characteristics of the game contents.

In accordance with another aspect of the present invention, there is provided an adaptive broadcasting service providing apparatus using metadata to provide adaptive broadcasting contents including game contents to a user terminal, the apparatus including: a contents providing means for publishing and providing the adaptive broadcasting contents including the game contents, and the metadata to the user terminal; and a contents searching means for providing contents identification information corresponding to a search and selection signal transmitted from the user terminal, wherein the metadata include: common description metadata for describing common characteristics of the broadcasting contents; and game description metadata for describing a characteristic of the game content.

In accordance with another aspect of the present invention, there is provided an adaptive broadcasting service providing method for providing adaptive broadcasting contents including game contents to a user terminal by using game metadata, the method including: a) publishing the adaptive broadcasting contents including the game contents and the game metadata to the user terminal; b) providing contents identification information corresponding to a search and selection signal transmitted from the user terminal; c) providing location information by determining physical location of a broadcasting content based on the contents identification information; and d) providing broadcasting contents based on the location information, wherein the game metadata describe characteristics of the game contents.

In accordance with another aspect of the present invention, there is provided a user terminal for receiving broadcasting contents including game contents based on game metadata in an adaptive broadcasting system for providing an adaptive broadcasting service in support of synchronizing and targeting functions from an adaptive broadcasting service providing apparatus to the user terminal, including: user interacting unit for searching, selecting and acquiring the game contents based on the game metadata which are published by the adaptive broadcasting service providing apparatus; a local storage managing unit for storing and managing the acquired game contents and game metadata; and a contents displaying unit for displaying the game contents and game metadata to the user, wherein the game metadata describe characteristics of the game contents.

In accordance with another aspect of the present invention, there is provided an adaptive broadcasting system for providing broadcasting contents including game contents based on game metadata, including: an adaptive broadcasting service providing apparatus for providing the broadcasting contents including the game contents by supporting a targeting function; and a user terminal for receiving and consuming the broadcasting contents including the game contents and game metadata from the adaptive broadcasting service providing apparatus, wherein the game metadata describe characteristics of the game contents.

In accordance with another aspect of the present invention, there is provided a game metadata scheme for a TV-Anytime (TVA) broadcasting service, including: game metadata, wherein the game metadata include: perspectives information for describing information on a role or a viewpoint of a user progressing a game; and the number information of players for showing the number of users who can access to the game.

Advantageous Effects

Since the present invention defines and uses metadata for describing characteristics of game contents, a user or a terminal can properly select and consume a game based on an object.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on prior art may blur the points of the present invention, the detailed description will not be provided herein. The preferred embodiments of the present invention will be described in detail hereinafter with reference to the attached drawings.

Figure 1:
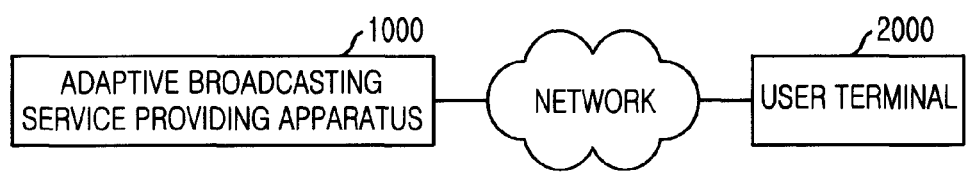
FIG. 1 is a block diagram showing an entire structure of an adaptive broadcasting system in accordance with an embodiment of the present invention.

FIG. 1 is a block diagram showing an entire structure of an adaptive broadcasting system in accordance with an embodiment of the present invention.

As shown in FIG. 1, the adaptive broadcasting system of the present invention includes an adaptive broadcasting service providing apparatus 1000 and a user terminal 2000. The adaptive broadcasting service providing apparatus 1000 provides broadcasting contents including an audio/video (AV) program and a package, and an adaptive broadcasting service supporting a synchronizing function and a targeting function. The user terminal 2000 consumes an application service such as contents search, selection, acquisition, and consumption based on contents and contents-related metadata from the adaptive broadcasting service providing apparatus 1000, which are connected to a network including a broadcasting channel/bi-directional IP network.

Figure 2:
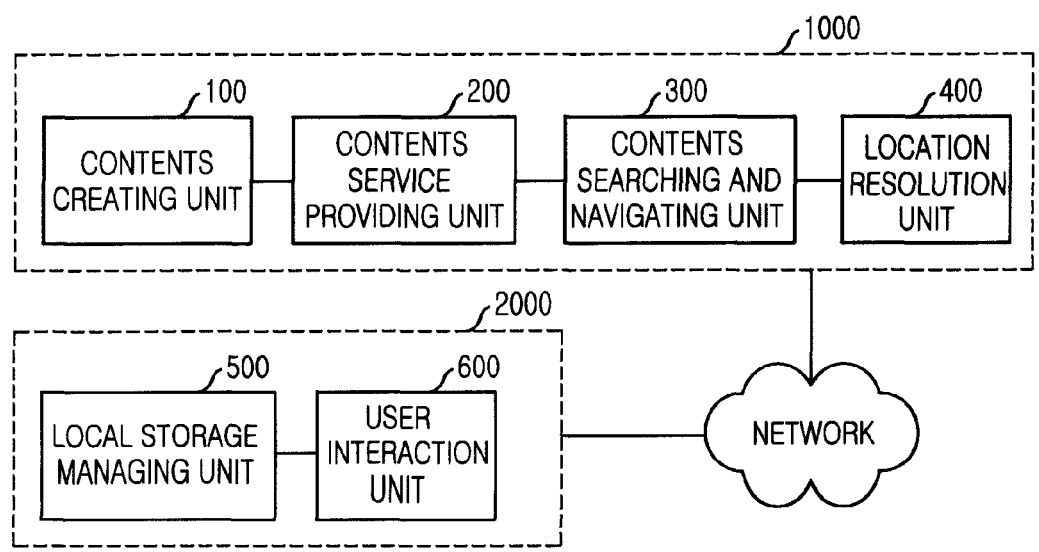
FIG. 2 is a block diagram illustrating the adaptive broadcasting system in detail in accordance with the embodiment of the present invention.

FIG. 2 is a block diagram illustrating the adaptive broadcasting system in detail in accordance with the embodiment of the present invention.

As shown in FIG. 2, the adaptive broadcasting service providing apparatus 1000 includes a contents creating unit 100, a contents service providing unit 200, a contents searching and navigating unit 300 and a location resolution unit 400. The user terminal 2000 includes a user interaction unit 600 and a local storage managing unit 500, and further includes a contents presenting unit (not shown) and a rights managing and protecting unit (not shown), which are not shown in the drawing. Functions of each constituent element are as follows.

The contents creating unit 100 creates an AV program and a package. A studio, an entertainment company, a Web designer, or a user adaptive contents producer can manage the work.

The contents service providing unit 200 reorganizes contents and metadata, inserts metadata and transmits contents, and terrestrial, satellite and cable broadcasting companies, Web casters or portal service providers can manage the work.

The contents searching and navigating unit 300 is based on broadcasting metadata published in Electronic Program Guide (EPG) for available contents. A contents searching and navigating function returns a contents identifier (CRID) of contents selected by a user or automatically selected by a terminal.

The location resolution unit 400 determines a physical location of contents including a channel and broadcasting time from the CRID acquired from the contents searching and navigating unit 300.

The local storage managing unit 500 stores and manages broadcasting contents and metadata. The metadata can be managed in an Extensible Markup Language (XML) database (DB) or a relational DB. A function connecting metadata between a user and a service provider in bi-directional corresponds to providing user history information and user preference information from the user.

The user interaction unit 600 drives constituent elements based on a user input signal inputted from an input device of a user terminal, e.g., a key board, a remote controller, a mouse and a joystick.

The contents presenting unit (not shown) provides broadcasting contents and metadata to the user terminal such that a user can use.

The rights managing and protecting unit (not shown) protects interface between the constituent elements based on a proper protecting/managing policy, which is revealed in "Bimetadata delivery protection" ETSI TS102 822-5-1/2 and ETSI TS 102 822-7.

The above-mentioned embodiment is an example of the adaptive broadcasting system in a complete bi-directional broadcasting environment.

A method for realizing the adaptive broadcasting system is largely divided into two based on a service environment. In a broadcasting environment having a sheer unidirectional broadcasting environment or a narrow-band bi-directional channel, only the contents creating unit and the contents service providing unit among the elements of the adaptive broadcasting system exist in the outside of the user terminal, e.g., Personal Digital Recorder (PDR), and all elements except the contents creating unit and the contents service providing unit makes a user consume desired contents through search, selection, location resolution and acquisition processes in the PDR.

Meanwhile, as described in the above embodiment, in a complete bi-directional broadcasting environment, the contents searching/navigating unit and the location resolution unit as well as the contents creating unit and the contents service providing unit among components of the adaptive broadcasting system can exist in the outside of the PDR. Therefore, the PDR includes only the user interaction unit, the contents presenting unit and the local storage managing unit, and makes a user consume desired contents through search, selection, location resolution and acquisition processes through bi-directional connection to the contents service providing unit or the contents searching and navigating unit.

Figure 3:
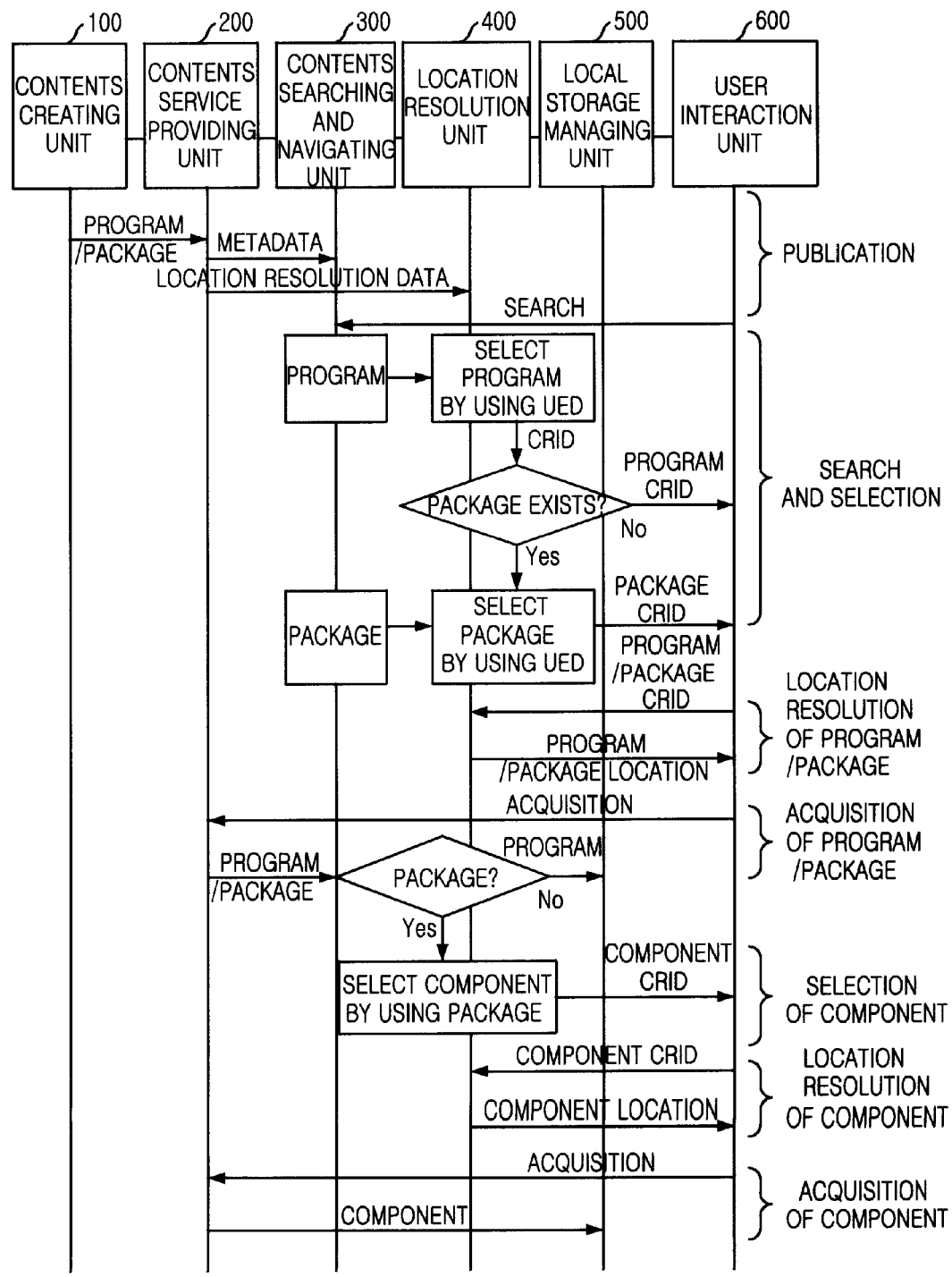
FIG. 3 is a flowchart showing an adaptive broadcasting service providing process using game metadata in accordance with the embodiment of the present invention.

FIG. 3 is a flowchart showing an adaptive broadcasting service providing process using game metadata in accordance with the embodiment of the present invention.

The adaptive broadcasting service providing process using the game metadata of the present invention includes steps of publication, search, selection, location resolution, acquisition, view and finishing. Each package including the game of the present invention has two operation scenarios in the process of publication, search and selection based on whether the package is independent from or dependent on the AV program.

Publication

When the package is independent from the AV program, the contents creating unit 100 creates a package including a game. The package is described based on a TVA-2 package schema, and game metadata, which are attractive metadata for the game, are described through 'ContentDescription', which is a low-rank element of a 'Descriptor' element.

Herein, the game metadata include common description metadata, which are metadata for describing common characteristics of any contents type including a game, and game description metadata, which are metadata for describing only characteristics of game contents.

The contents service providing unit 200 publishes Content Reference Identifier (CRID) for identifying a package, package attractive metadata for inducing package consumption and general schedule information of the package. The contents service providing unit 200 also publishes location resolution data for describing when and where the package can be acquired.

Herein, the attractive metadata and the schedule information of the package are described as program information (ProgramInformation) and program location (ProgramLocation) of a TVA-1 metadata schema as the general AV program.

When the package is dependent on the AV program, the contents creating unit creates an AV program and a package which is dependent on the AV program and including a game.

The contents service provider publishes CRID for identifying the AV program, attractive metadata of the AV program, schedule information, location resolution information and link information of a package connected to the AV program.

Herein, the attractive metadata and the schedule information of the AV program are described as 'ProgramInformation' and 'ProgramLocation' of the TVA-1 metadata schema, and link information of the package connected to the AV program is described as a 'RelatedMaterial' element of 'ProgramInformation' in the AV program.

The homogeneous or heterogeneous contents service provider publishes location resolution data for describing when and where the CRID for identifying the package and the package can be acquired.

Search

When the package is independent from AV program, the EPG provides package attractive metadata and package schedule information to a user. The user searches an interesting package through package attractive metadata such as a package title, synopsis and actors provided by the EPG.

Meanwhile, when the package is dependent on the AV program, the EPG provides link information of the package connected to the AV program with attractive metadata and schedule information of the AV program. The user acquires information on the package connected to the AV program while the user searches the AV program through the EPG or watches the program.

Selection

When the package is independent from the AV program and the user selects a package preferred by the user in the EPG, the CRID of the package is acquired.

Meanwhile, when the package is dependent on the AV program, the user acquires the CRID of the package connected to the AV program from 'RelatedMaterial' element of program information (ProgramInformation) in the AV program.

Location Resolution

Physical location information, in which a real package is provided, is acquired through a location resolution mechanism from the package CRID. The local storage managing unit 500 selects any location among a plurality of contents locations including channel and time information to prevent a collision during recording.

Acquisition

A package is transmitted from selected location information including channel and time information.

The user acquires the package and automatically or semi-automatically selects 'ContentDescription', which is attractive metadata of individual components of the package, and entire or part of components to be consumed based on a usage environment of the user.

Herein, the 'ContentDescription', which is the attractive metadata of the individual components, describes characteristics of game contents of the present invention as well as an application program, an advertisement, an image and a text.

When the game components are selected, physical location information, in which real game components are provided through a location resolution mechanism from the CRID of each game component, is required. Also, the game components are acquired from the location.

View

When all components including the game component selected by the user are acquired, a screen is organized based on spatial/temporal relationship information between components and provided to a user.

Finishing

The package watching history information of the user is stored in a terminal and used to extract preference of the user.

Game metadata of the present invention will be described in detail hereinafter.

As described above, the game metadata for describing a game is divided into 'BasicObjectDescriptionType', which is common description metadata, and game description metadata. The 'BasicObjectDescriptionType' describes common characteristics of contents type including a game and the game description metadata describe characteristics of a game content.

Figure 4:
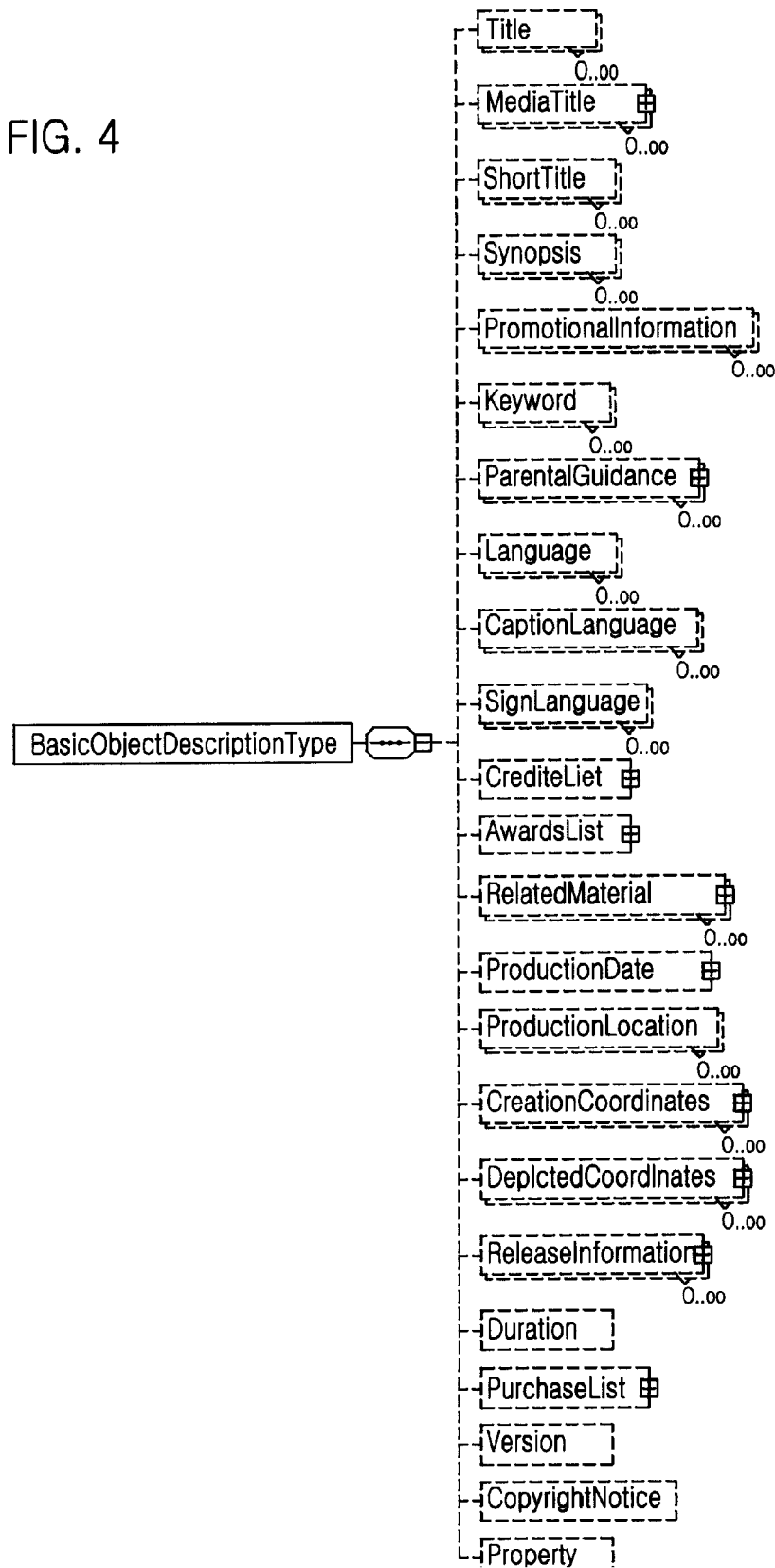
FIG. 4 shows common description metadata in accordance with the embodiment of the present invention.

FIG. 4 shows common description metadata (BasicObjectDescriptionType) in accordance with the embodiment of the present invention.

As described above, the 'BasicObjectDescriptionType' of the present invention is metadata for describing a common characteristic of any contents including a game.

Figure 5:
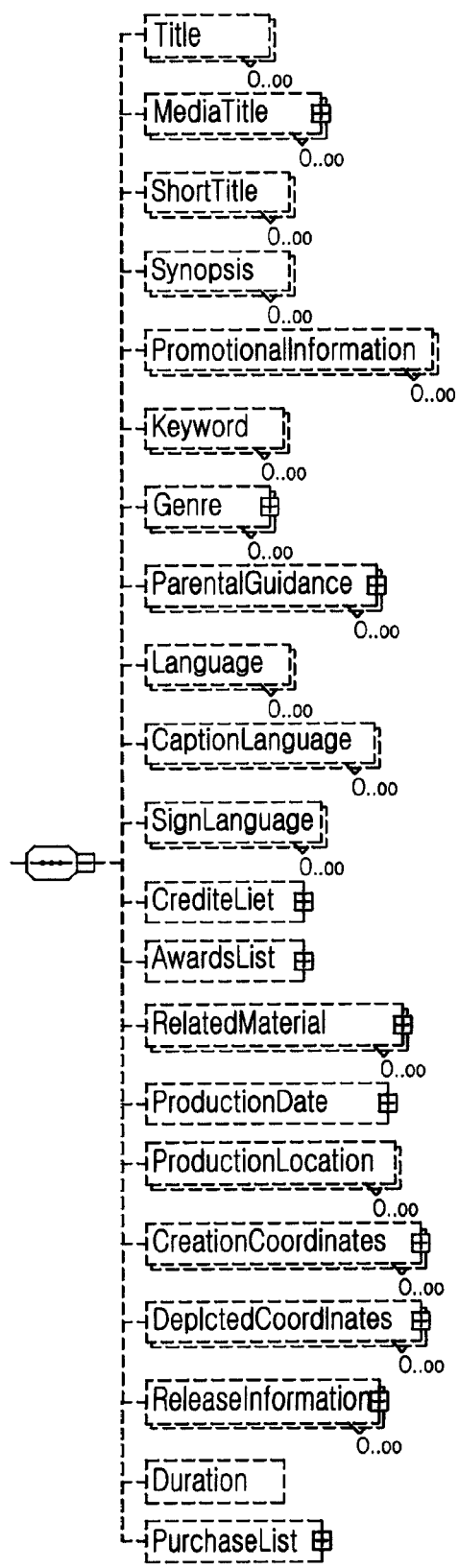
FIG. 5 shows audio/video (AV) contents description metadata (BasicContentDescription) of a conventional TV-anytime 1 (TVA-1)

As shown in FIG. 4, general elements defined in the 'BasicObjectDescriptionType' use constituent elements of 'BasicContentDescriptionType', which is AV contents description metadata defined in TVA-1, as shown in FIG. 5.

The 'BasicObjectDescriptionType' is a major constituent element and includes a 'Title', 'MediaTitle', 'Synopsis', 'Language', 'Production Date', 'Production Location', 'ReleaseInformation' and 'Price'.

The 'MediaTitle' includes a thumbnail image for providing a preview before capturing a game, and a movie trailer.

The 'Synopsis' provides a text description on the characteristics of the game has, and the 'Price' provides price information on the game and can use 'PurchaseList' in 'BasicContentDescription'.

Figure 6:
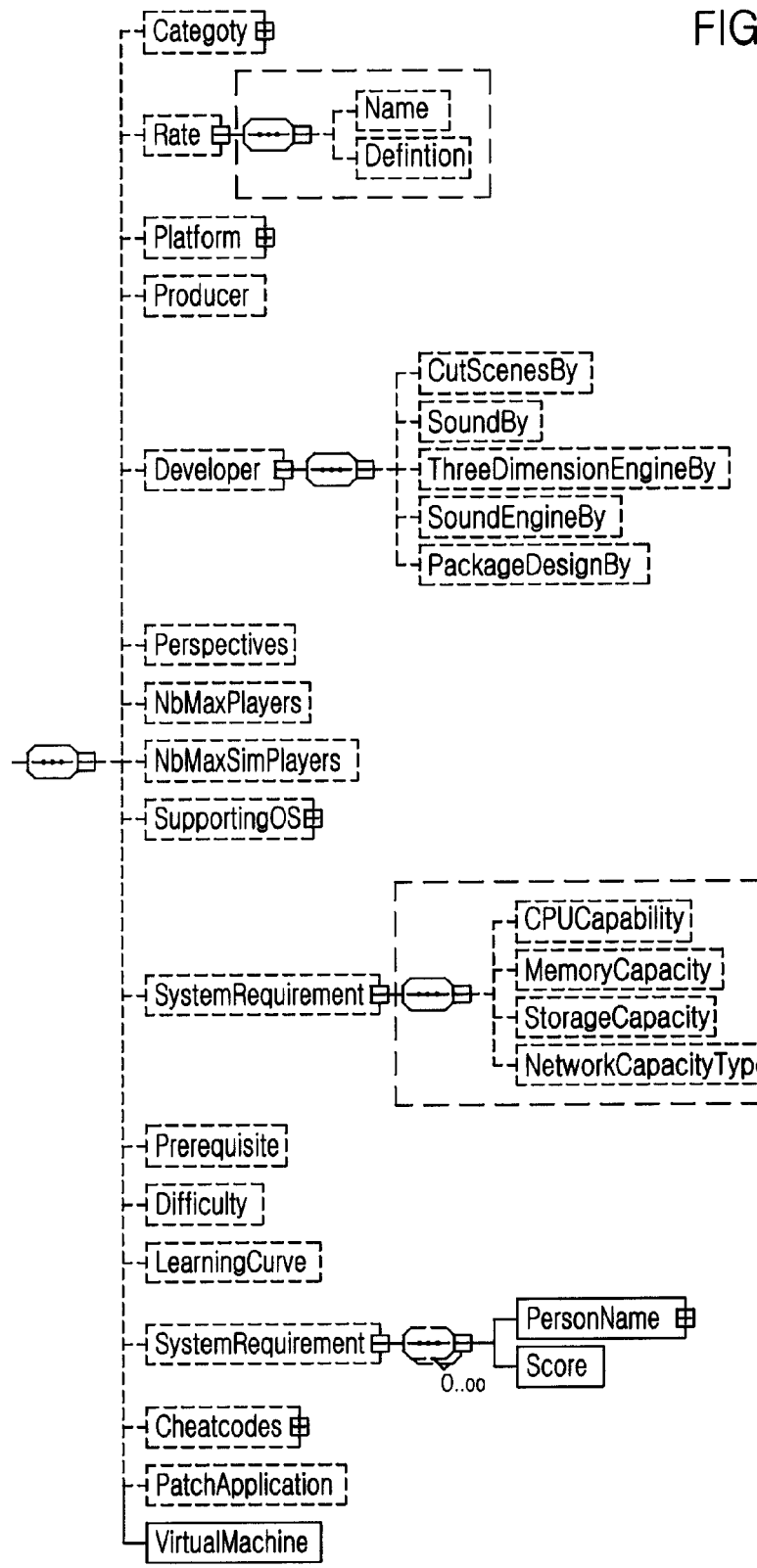
FIG. 6 shows game description metadata in accordance with the embodiment of the present invention.

FIG. 6 shows game description metadata (GameContentTypeObjectDescription) in accordance with the embodiment of the present invention.

As shown in FIG. 6, the 'GameContentTypeobjectDescription' includes 'Category', 'Rate', 'Platform', 'Producer', 'Developer', 'Perspectives', the maximum number of players (NbMaxPlayers), the number of simultaneously accessing players (NbMaxSimPlayers), 'Supporting OS', 'System Requirement', 'Prerequisite', 'Difficulty', 'LearningCurve', 'BestScores', 'Cheatcodes', 'PatchApplication' and 'VirtualMachine'.

The 'Developer' includes a cutscene drawer (CutSceneBy), a sound generator (SoundBy), a three-dimensional engine engineer (ThreeDimension EngineBy), a sound engine engineer (SoundEngineBy) and a package designer (PackageDesignBy).

The 'System Requirement' includes 'CPUCapability', 'MemoryCapacity', 'StorageCapacity' and 'NetworkCapability Type'.

The 'BestScores' includes a name of players (PersonName) and Score.

The 'Cheatcodes' includes a cheat code (Code) and Effect.

The definition of each element described above is shown in Table 1:

TABLE 1

| Title | Definition |
| --- | --- |
| Category | This field describes a game type such as an action, adventure and sports. The CS is defined in urn:tva:metadata:Phase2:cs:GameCategoryCS: 2005. |
| Rate | The rate provides information on a game based on contents and age-appropriateness. The rate helps parents and other consumers select a right game for their family. The CS defined in urn:tva:metadata:cs:IntendedAudienceCS: 2002 is reused. |
| Platform | This field displays what kind of apparatus a game targets on. To classify a specific platform of the game according to urn:tva:metadata:Phase2:cs:DeviceClassCS: 2005, DeviceClassCS used in terminal environment technology in present UED is updated. |
| Producer | This field displays which producer produces the game. |
| Developer | This field displays which developer develops the game. The developer can be as follows: |
| CutSceneBy | cut-scene drawer, sound engine engineer and package designer |
| SoundBy | Sound effect generator |
| ThreeDimension EngineBy | Engineer for processing 3D engine |
| SoundEngineBy | Engineer for processing a sound engine |
| PackageDesignBy | Game package designer |
| Perspectives | Playing perspectives define a role or a viewpoint of a player in game. These perspectives include First-person, Third-person, top-down, Isometric, Side-scroller, Platform and Text-based. Each is defined in the paragraph 2.1. |
| NbMaxPlayers | The maximum number of players who can access to the game. The game can be divided into a mono-player game and a multi-player game based on the maximum number. |
| NbMaxSimPlayers | The maximum number of players who simultaneously access to the game in a history. |
| Supporting OS | MS-DOS, Window 3.1, Window 95/98/NT, OS/2, UNIX, LINUX, MAC OS, Solaris, Window CE |
| System Requirement | This field describes minimum requirements for the operated application. |
| CPUCapability | CPU capability operating the application such as '1300 MHz' |
| MemoryCapacity | Memory capacity for operating the application such as '64 MB' |
| StorageCapacity | Memory capacity for storing the application such as '128 MB' |
| NetworkCapability Type | General network consumption such as Kbps, KBps and Mbps when a network is used |
| Prerequisite | This field describes an prerequisite application such as DirectX and MPEG-2 decoder. |

TABLE 1-continued

| Title | Definition |
| --- | --- |
| Difficulty | This field displays how difficult the game is. The rate of Difficulty includes 'Hard', 'Moderately Hard', 'Medium Hard' and 'Easy'. |
| LearningCurve | This field displays how long it takes to learn the game. The quantity of the time is described by using 'mpeg7:mediaDurationType'. |
| BestScores | List of players in the upper rank or his/her score |
| PersonName | Name of players |
| Score | Score of players |
| Cheatcodes | Cheat-code is a command for easily clearing and operating a game such as 'show me the money' and 'black sleep wall' in StarCraft. |
| Code | Command as Cheat-code |
| Effect | Effect acquired when a code is used. |
| PatchApplication | PatchApplication is an application for updating the game and/or fixing a bug in the game. PatchApplication is described by using an element from ApplicationContentModeObjectDescription. Herein, constituent element of PatchApplication and/or a link as an item from the game are provided. |

An XML syntax of 'GameContentTypeObjectDescription', i.e., the game description metadata, is as follows:

```
<xs:complexType name="GameContentTypeObjectDescriptionType">
<xs:complexContent>
<xs:extension base="did:ContentTypeBasedObjectDescriptionType">
<xs:sequence minOccurs="0">
<xs:element name="Category" type="tva:ControlledTermType"
  minOccurs="0"/>
    <xs:element name="Rate" type="tva:ControlledTermType"
      minOccurs="0"/>
<xs:element name="GameDevice" type="tva:ControlledTermType"
    minOccurs="0"/>
<xs:element name="Producer" type="xs:string" minOccurs="0"/>
<xs:element name="Developer" minOccurs="0">
<xs:complexType>
<xs:sequence>
<xs:element name="CutScenesBy" type="xs:string" minOccurs="0"/>
<xs:element name="SoundBy" type="xs:string" minOccurs="0"/>
<xs:element name="ThreeDimensionEngineBy" type="xs:string"
  minOccurs="0"/>
<xs:element name="SoundEngineBy" type="xs:string" minOccurs="0"/>
<xs:element name="PackageDesignBy" type="xs:string"
  minOccurs="0"/>
</xs:sequence>
</xs:complexType>
    </xs:element>
<xs:element name="Perspectives" minOccurs="0">
<xs:simpleType>
<xs:restriction base="xs:string">
<xs:enumeration value="First-Person Perspective"/>
<xs:enumeration value="Third-Person Perspective"/>
<xs:enumeration value="Top-Down"/>
<xs:enumeration value="Isometric"/>
<xs:enumeration value="Side-Scroller"/>
<xs:enumeration value="Platform"/>
<xs:enumeration value="Text-Based Games"/>
</xs:restriction>
</xs:simpleType>
</xs:element>
<xs:element name="NbMaxPlayers" type="xs:nonNegativeInteger"
  minOccurs="0"/>
<xs:element name="NbMaxSimPlayers" type="xs:nonNegativeInteger"
  minOccurs="0"/>
<xs:element name="SupportingOS" type="did:SupportingOSType"
  minOccurs="0"/>
<xs:element name="SystemRequirement"
  type="did:SystemRequirementType" minOccurs="0"/>
<xs:element name="Prerequisite" type="xs:string" minOccurs="0"/>
<xs:element name="Difficulty" minOccurs="0">
<xs:simpleType>
<xs:restriction base="xs:string">
<xs:enumeration value="Hard"/>
<xs:enumeration value="Moderately Hard"/>
<xs:enumeration value="Medium Hard"/>
<xs:enumeration value="Easy"/>
</xs:restriction>
</xs:simpleType>
</xs:element>
<xs:element name="LearningCurve" type="mpeg7:mediaDurationType"
  minOccurs="0"/>
<xs:element name="BestScores" minOccurs="0">
<xs:complexType>
<xs:sequence minOccurs="0" maxOccurs="unbounded">
<xs:element name="PersonName" type="mpeg7:PersonNameType"/>
<xs:element name="Score" type="xs:nonNegativeInteger"/>
</xs:sequence>
</xs:complexType>
</xs:element>
    <xs:element name="Cheatcodes" minOccurs="0">
<xs:complexType>
<xs:sequence minOccurs="0" maxOccurs="unbounded">
<xs:element name="Code" type="mpeg7:TextualType"/>
<xs:element name="Effect" type="mpeg7:TextualType"/>
</xs:sequence>
</xs:complexType>
    </xs:element>
    <xs:element name="PatchApplication" minOccurs="0">
<xs:complexType>
<xs:attribute name="applicationlist" type="tva:TVAIDRefsType"/>
</xs:complexType>
    </xs:element>
</xs:sequence>
</xs:extension>
</xs:complexContent>
    </xs:complexType>
```

Major element among constitutent elements of the GameContentTypeObjectDescription described above will be described in detail hereinafter.

The 'Perspectives' means playing perspectives and it defines a role or a viewpoint of a player who plays a game. The Perspectives include First-Person, Third-Person, top-down, isometric, flat, side-view and text-based view.

The 'Perspectives' is expressed as the following XML syntax of 'GamePerspectivesCS' and a definition of the constituent element is shown in Table 2:

```
<xml version="1.0" encoding="UTF-8">
<ClassificationScheme
  uri="urn:tva:metadata:extended:cs:GamePerspectivesCS:2005">
<!--##########################################################--
>
<!--Perspectives for Game-->
<!--Definition: This is a set of terms used within Content Packaging to
indicate -->
<!-- the kinds of perspectives which define the role or point of view
that the player has on the game -->
<!--##########################################################--
>
<Term termId="1">
<Name xml:lang="en">First-Person</Name>
<Definition xml:lang="en">
Displayed from a 1st-person perspective or view; ie. from the viewer's
own eyes.
</Definition>
</Term>
<Term termId="2">
```

```
<Name xml:lang="en">Third-Person</Name>
<Definition xml:lang="en">
Displayed from a 3rd-person perspective or view; ie. player is able to
see him/herself.
</Definition>
</Term>
<Term termId="3">
<Name xml:lang="en">Top-Down</Name>
<Definition xml:lang="en">
Used to describe any game where the main setting of gameplay is
represented by a "top-down" view of the playfield; used in describing
both shooters and adventure games.
</Definition>
</Term>
<Term termId="4">
<Name xml:lang="en">Isometric</Name>
<Definition xml:lang="en">
Playfield is technically two-dimensional, but drawn in an isometric
view so that the game looks three-dimensional.
</Definition>
</Term>
<Term termId="5">
<Name xml:lang="en">Flat, Side-View</Name>
<Definition xml:lang="en">
The flat, side-view is the traditional two-dimensional "side view" of
the action.
</Definition>
<Term termId="5.1">
<Name xml:lang="en">Side-scroller</Name>
<Definition xml:lang="en">
Used to describe any game where the main setting of gameplay involves
the player moving from one side of the playfield to the other
horizontally for a length of time.
</Definition>
</Term>
<Term termId="5.2">
<Name xml:lang="en">platform</Name>
<Definition xml:lang="en">
Describes any action game where the playfield is set up as a series of
floors, levels, or platforms for the player to navigate.
</Definition>
</Term>
</Term>
<Term termId="6">
<Name xml:lang="en">Text-Based Game</Name>
<Definition xml:lang="en">
There are very few text-based games that don't use graphics at all or
very sparingly.
</Definition>
</Term>
    </ClassificationScheme>
```

TABLE 2

| Perspectives | Definition |
| --- | --- |
| First-Person | Something is seen from a viewpoint of a first-person, i.e., eyes of an observer. This perspective is not used to describe interacting fiction since all interacting fictions become the first-person by definition. |
| Third-Person | Something is seen from a viewpoint or view of a third-person. That is, the player can see himself/herself. |
| Top-Down | This is used to describe a predetermined game, in which a main configuration of a gameplay is displayed by a "Top-Down" view of a playfield. It is used to describe shooters or both parts of an adventure game. |
| Isometric | The playfield is technically 2-dimensional, but it is described as isometric view such that the game can be seen in 3-dimensional. The motion is diagonally biased diagonally instead of straight up/down/left/right, e.g., Ultra 7-8, The Immortal, Marble Madness, Diablo, etc. |

TABLE 2-continued

| Perspectives | Definition |
| --- | --- |
| Flat, Side-View | The Flat and Side-View are traditional 2D "Side-View" of action, and the perspective which gets less popular over several years becomes a standard. The view is popularized due to "Side-Scroller" and "Platform", which were very common in late 1980s and early 1990s. Side-Scroller Platform |
| Text-Based Games | There are few text-based games which never use graphics or use it insufficiently. The present on-line Outsmart game of Microsoft as well as the classical text adventure from early 1980s such as Zork series from Infocom and Hitchhiker's Guide to the Galaxy of Douglas Adams are good examples of the type of the game. |

The 'NbMaxPlayers' means the maximum number of players who can access to a game, i.e., who can play the game. The game can be divided into a mono-player game and a multi-player game based on the maximum number.

Main elements, which are related to an environment of a user terminal among constituent elements of the 'GameContentTypeobjectDescription', will be described in detail hereinafter.

The 'Supporting OS' shows a kind of the operating system of the user terminal, in which the game can be consumed, and includes MS-DOS, Window 3.1, Window 95/98/NT, OS/2, UNIX, LINUX, MAC OS, Solaris and Window CE. The XML syntax is as follows:

```
<xml version="1.0" encoding="UTF-8">
<ClassificationScheme
 uri="urn:tva:metadata:extended:cs:OperatingSystemCS:2005">
<Term termID="1">
<Name xml:lang="en">DOS</Name>
</Term>
<Term termID="2">
<Name xml:lang="en">Windows</Name>
<Term termID="2.1">
<Name xml:lang="en">Windows 3.X</Name>
</Term>
<Term termID="2.2">
<Name xml:lang="en">Windows 95</Name>
</Term>
<Term termID="2.3">
<Name xml:lang="en">Windows 98</Name>
</Term>
<Term termID="2.4">
<Name xml:lang="en">Windows Me</Name>
</Term>
<Term termID="2.5">
<Name xml:lang="en">Windows NT</Name>
</Term>
<Term termID="2.6">
<Name xml:lang="en">Windows 2000</Name>
</Term>
<Term termID="2.7">
<Name xml:lang="en">Windows 2003 Server</Name>
</Term>
<Term termID="2.8">
<Name xml:lang="en">Windows XP</Name>
</Term>
</Term>
<Term termID="3">
<Name xml:lang="en">Linux</Name>
</Term>
<Term termID="4">
<Name xml:lang="en">Unix</Name>
</Term>
```

```
<Term termID="5">
<Name xml:lang="en">Solaris</Name>
</Term>
<Term termID="6">
<Name xml:lang="en">OS2</Name>
</Term>
<Term termID="7">
<Name xml:lang="en">Mac</Name>
<Term termID="7.1">
<Name xml:lang="en">System 6</Name>
</Term>
<Term termID="7.2">
<Name xml:lang="en">System 7</Name>
</Term>
<Term termID="7.3">
<Name xml:lang="en">Mac OS 7.x</Name>
</Term>
<Term termID="7.4">
<Name xml:lang="en">Mac OS 8.x</Name>
</Term>
<Term termID="7.5">
<Name xml:lang="en">Mac OS 9.x</Name>
</Term>
<Term termID="7.6">
<Name xml:lang="en">Mac OS X</Name>
</Term>
<Term termID="7.7">
<Name xml:lang="en">Mac OS X Server</Name>
</Term>
</Term>
<Term termID="8">
<Name xml:lang="en">Mobile</Name>
<Term termID="8.1">
<Name xml:lang="en">Palm OS 1.x</Name>
</Term>
<Term termID="8.2">
<Name xml:lang="en">Palm OS 2.x</Name>
</Term>
<Term termID="8.3">
<Name xml:lang="en">Palm OS 3.x</Name>
</Term>
<Term termID="8.4">
<Name xml:lang="en">Palm OS 4.x</Name>
</Term>
<Term termID="8.5">
<Name xml:lang="en">Palm OS 5.x</Name>
</Term>
<Term termID="8.6">
<Name xml:lang="en">Windows CE 1.x</Name>
</Term>
<Term termID="8.7">
<Name xml:lang="en">Windows CE 2.x</Name>
</Term>
<Term termID="8.8">
<Name xml:lang="en">Pocket PC</Name>
</Term>
<Term termID="8.9">
<Name xml:lang="en">Pocket PC 2002</Name>
</Term>
<Term termID="8.10">
<Name xml:lang="en">Pocket PC 2003</Name>
</Term>
<Term termID="8.11">
<Name xml:lang="en">Celvic OS</Name>
</Term>
<Term termID="8.12">
<Name xml:lang="en">EPOC (Psion OS)</Name>
</Term>
<Term termID="8.13">
<Name xml:lang="en">Symbian</Name>
</Term>
<Term termID="8.14">
<Name xml:lang="en">Windows Mobile 2003 Phone Edition</Name>
</Term>
</Term>
<Term termID="9">
<Name xml:lang="en">Embedded OS</Name>
<Term termID="9.1">
<Name xml:lang="en">Windows CE</Name>
</Term>
<Term termID="9.2">
<Name xml:lang="en">Embedded Linux </Name>
</Term>
<Term termID="9.3">
<Name xml:lang="en">Embedded Java</Name>
</Term>
</Term>
<Term termID="10">
<Name xml:lang="en">RTOS (Real Time OS)</Name>
<Term termID="10.1">
<Name xml:lang="en">pSOS</Name>
</Term>
<Term termID="10.2">
<Name xml:lang="en">OS-9</Name>
</Term>
<Term termID="10.3">
<Name xml:lang="en">VxWorks</Name>
</Term>
<Term termID="10.4">
<Name xml:lang="en">QNX</Name>
</Term>
<Term termID="10.5">
<Name xml:lang="en">VRTX</Name>
</Term>
<Term termID="10.6">
<Name xml:lang="en">Nucleus</Name>
</Term>
<Term termID="10.7">
<Name xml:lang="en">Qplus</Name>
</Term>
<Term termID="10.8">
<Name xml:lang="en">Lynx</Name>
</Term>
<Term termID="10.9">
<Name xml:lang="en">RT-Linux</Name>
</Term>
</Term>
    </ClassificationScheme>
```

The 'System Requirement' describes the minimum requirement of a system required for operation of a game. For example, the 'System Requirement' describes a CPU capacity such as "higher than Pentium", a memory capacity such as "more than 256 MB" and a network capacity such as 50 Kbps. An XML syntax is as follows:

```
<xml version="1.0" encoding="UTF-8">
<ClassificationScheme
 uri="urn:tva:metadata:extended:cs:CPUTypeCS:2005">
<!--########################################################--
>
<!--CPUType-->
<!--Definition: This is a set of terms used within Content Packaging to
indicate -->
<!-- what kind of CPU is used in the Terminal written by HeeKyung Lee--
>
<!--########################################################--
>
<Term termID="1">
<Name xml:lang="en">CPU for PC</Name>
<Term termID="1.1">
    <Name xml:lang="en">Intel</Name>
    <Term termID="1.1.1">
       <Name xml:lang="en">4004</Name>
    </Term>
    <Term termID="1.1.2">
       <Name xml:lang="en">8008</Name>
    </Term>
    <Term termID="1.1.3">
       <Name xml:lang="en">8080</Name>
    </Term>
    <Term termID="1.1.4">
       <Name xml:lang="en">8086</Name>
    </Term>
    <Term termID="1.1.5">
```

```xml
        <Name xml:lang="en">8088</Name>
    </Term>
    <Term termID="1.1.6">
        <Name xml:lang="en">(80)286</Name>
    </Term>
    <Term termID="1.1.7">
        <Name xml:lang="en">(80)386</Name>
    </Term>
    <Term termID="1.1.8">
        <Name xml:lang="en">(80)486</Name>
    </Term>
    <Term termID="1.1.9">
        <Name xml:lang="en">Pentium</Name>
    </Term>
    <Term termID="1.1.10">
        <Name xml:lang="en">Pentium Pro</Name>
    </Term>
    <Term termID="1.1.11">
        <Name xml:lang="en">Pentium MMX</Name>
    </Term>
    <Term termID="1.1.12">
        <Name xml:lang="en">Pentium II</Name>
    </Term>
    <Term termID="1.1.13">
        <Name xml:lang="en">Celeron</Name>
        <Term termID="1.1.13.1">
            <Name xml:lang="en">Celeron Northwood</Name>
        </Term>
        <Term termID="1.1.13.2">
            <Name xml:lang="en">CeleronD Prescott</Name>
        </Term>
    </Term>
    <Term termID="1.1.14">
        <Name xml:lang="en">Xeon</Name>
    </Term>
    <Term termID="1.1.15">
        <Name xml:lang="en">Itanium</Name>
    </Term>
    <Term termID="1.1.16">
        <Name xml:lang="en">Pentium IV</Name>
        <Term termID="1.1.16.1">
            <Name xml:lang="en">Pentium IV Northwood</Name>
        </Term>
        <Term termID="1.1.16.2">
            <Name xml:lang="en">Pentium IV Willamette</Name>
        </Term>
        <Term termID="1.1.16.2">
            <Name xml:lang="en">Pentium IV Prescott</Name>
        </Term>
    </Term>
    <Term termID="1.1.17">
        <Name xml:lang="en">McKinley</Name>
    </Term>
    <Term termID="1.1.18">
        <Name xml:lang="en">Deerfield</Name>
    </Term>
</Term>
<Term termID="1.2">
    <Name xml:lang="en">AMD</Name>
    <Term termID="1.2.1">
        <Name xml:lang="en">K5</Name>
    </Term>
    <Term termID="1.2.2">
        <Name xml:lang="en">K6</Name>
    </Term>
    <Term termID="1.2.3">
        <Name xml:lang="en">K6-2</Name>
    </Term>
    <Term termID="1.2.4">
        <Name xml:lang="en">K6-3</Name>
    </Term>
    <Term termID="1.2.5">
        <Name xml:lang="en">Duron</Name>
    </Term>
    <Term termID="1.2.6">
        <Name xml:lang="en">Sempron</Name>
        <Term termID="1.2.6.1">
            <Name xml:lang="en">Sempron ThoroughbredB</Name>
        </Term>
        <Term termID="1.2.6.2">
            <Name xml:lang="en">Sempron Paris</Name>
        </Term>
        <Term termID="1.2.6.3">
            <Name xml:lang="en">Sempron Palermo</Name>
        </Term>
    </Term>
    <Term termID="1.2.7">
        <Name xml:lang="en">Athlon Professional Ultra</Name>
        <Term termID="1.2.7.1">
            <Name xml:lang="en">Athlon 64</Name>
            <Term termID="1.2.7.1.1">
                <Name xml:lang="en">Athlon 64 NewCastle</Name>
            </Term>
            <Term termID="1.2.7.1.2">
                <Name xml:lang="en">Athlon 64 Winchester</Name>
            </Term>
            <Term termID="1.2.7.1.3">
                <Name xml:lang="en">Athlon 64 Claw-Hammer</Name>
            </Term>
            <Term termID="1.2.7.1.4">
                <Name xml:lang="en">Athlon 64 FX 55 Claw-Hammer</Name>
            </Term>
        </Term>
        <Term termID="1.2.7.2">
            <Name xml:lang="en">AthlonXP</Name>
            <Term termID="1.2.7.2.1">
                <Name xml:lang="en">AthlonXP Barton</Name>
            </Term>
            <Term termID="1.2.7.2.2">
                <Name xml:lang="en">AthlonXP M Barton</Name>
            </Term>
        </Term>
    </Term>
    <Term termID="1.2.8">
        <Name xml:lang="en">Opteron Sledge-Hammer</Name>
    </Term>
    <Term termID="1.2.9">
        <Name xml:lang="en">K8 </Name>
    </Term>
</Term>
<Term termID="1.3">
    <Name xml:lang="en">VIA</Name>
    <Term termID="3.1">
        <Name xml:lang="en">VIA C3 Nehemiah</Name>
    </Term>
</Term>
</Term>
<Term termID="2">
<Name xml:lang="en">CPU for PDA</Name>
<Term termID="2.1">
    <Name xml:lang="en">Motorola</Name>
    <Term termID="2.1.1">
        <Name xml:lang="en">Dragonball</Name>
    </Term>
</Term>
<Term termID="2.2">
    <Name xml:lang="en">Hitachi</Name>
    <Term termID="2.2.1">
        <Name xml:lang="en">SH</Name>
    </Term>
</Term>
<Term termID="2.3">
    <Name xml:lang="en">NEC</Name>
    <Term termID="2.3.1">
        <Name xml:lang="en">VR</Name>
    </Term>
</Term>
<Term termID="2.4">
    <Name xml:lang="en">Intel</Name>
    <Term termID="2.4.1">
        <Name xml:lang="en">StrongARM</Name>
    </Term>
</Term>
</Term>
<Term termID="3">
<Name xml:lang="en">CPU for Settop</Name>
<Term termID="3.1">
```

```
<Name xml:lang="en">ATI</Name>
<Term termID="3.1.1">
    <Name xml:lang="en">XILLEON</Name>
    </Term>
</Term>
<Term termID="3.2">
    <Name xml:lang="en">Zoran</Name>
    <Term termID="3.2.1">
        <Name xml:lang="en">Elite(G9)</Name>
        </Term>
</Term>
<Term termID="3.3">
    <Name xml:lang="en">Philips</Name>
    <Term termID="3.3.1">
        <Name xml:lang="en">SA7219</Name>
        </Term>
    <Term termID="3.3.2">
        <Name xml:lang="en">SA7240</Name>
        </Term>
    </Term>
</Term>
</ClassificationScheme>
```

The 'Prerequsite' describes an application which are required in advance for game consumption such as DirectX and MPEG-2 decoder (refer to the XML syntax of other system software information (OtherSystemSW) in a second embodiment).

The 'VirtualMachine' describes a kind of a virtual machine in a user terminal, in which a game can be consumed, and an XML syntax is as follows:

```
<xml version="1.0" encoding="UTF-8">
<ClassificationScheme
 uri="urn:tva:metadata:extended:cs:VirtualMachineCS:2005">
<!--###############################################-->
<!--VirtualMachineCS-->
<!--Definition: This is a set of terms used within Content Packaging to indicate -->
<!-- what kind of virtual machine is used in the Terminal written by HeeKyung Lee-->
<!--###############################################-->
<Term termID="1">
    <Name xml:lang="en">Core War</Name>
    </Term>
<Term termID="2">
    <Name xml:lang="en">Java VM</Name>
    <Term termID="2.1">
        <Name xml:lang="en">Platform</Name>
        <Term termID="2.1.1">
            <Name xml:lang="en">J2SE</Name>
            </Term>
        <Term termID="2.1.2">
            <Name xml:lang="en">J2EE</Name>
            </Term>
        <Term termID="2.1.3">
            <Name xml:lang="en">J2ME</Name>
            </Term>
        </Term>
    <Term termID="2.2">
        <Name xml:lang="en">Speed</Name>
        <Term termID="2.2.1">
            <Name xml:lang="en">Classic</Name>
            </Term>
        <Term termID="2.2.2">
            <Name xml:lang="en">Hotspot</Name>
            </Term>
        </Term>
    <Term termID="2.3">
        <Name xml:lang="en">For J2ME</Name>
        <Term termID="2.3.1">
            <Name xml:lang="en">KVM(Kilobyte VM)</Name>
            </Term>
        <Term termID="2.3.2">
            <Name xml:lang="en">GVM(Game VM)</Name>
            </Term>
        <Term termID="2.3.3">
        <Name xml:lang="en">MAP(Mobile Application S/W plugin)</Name>
            </Term>
        <Term termID="2.3.4">
            <Name xml:lang="en">BREW</Name>
            </Term>
        <Term termID="2.3.5">
            <Name xml:lang="en">Redbook compliant VM</Name>
            </Term>
        </Term>
    </Term>
<Term termID="3">
    <Name xml:lang="en">OCODE</Name>
    </Term>
<Term termID="4">
    <Name xml:lang="en">OS/2</Name>
    </Term>
<Term termID="5">
    <Name xml:lang="en">POPLOG</Name>
    </Term>
<Term termID="6">
    <Name xml:lang="en">Portable Scheme Interpreter</Name>
    </Term>
<Term termID="7">
    <Name xml:lang="en">Portable Standard Lisp</Name>
    </Term>
<Term termID="8">
    <Name xml:lang="en">Parallel Virtual Machine</Name>
    </Term>
<Term termID="9">
    <Name xml:lang="en">Sequential Parlog Machine</Name>
    </Term>
<Term termID="10">
    <Name xml:lang="en">SNOBOL Implementation Language</Name>
    </Term>
<Term termID="11">
    <Name xml:lang="en">SODA</Name>
    </Term>
<Term termID="12">
    <Name xml:lang="en">Smalltalk</Name>
    </Term>
</ClassificationScheme>
```

Other main constituent elements of the 'GameContentTypeObjectDescription' will be described in detail hereinafter.

The 'Category' describes the kinds of games. 'Game Category CS', which is an XML representation of a category of the present invention, is derived from a game category suggested in "The Medium of the Video Game (refer to http://www.robinlionheart.com/gamedev/genres.xhtml), which is a book written by Mark J. P. Wolf. An XML syntax is as follows:

```
<xml version="1.0" encoding="UTF-8">
<ClassificationScheme
uri="urn:tva:metadata:Phase2:cs:GameCategoryCS:2005">
<!--###############################################-->
<!--Game Category                  -->
<!--Definition: This is a set of terms used within Content Packaging to
indicate the kinds of game         -->
<!--###############################################-->
    <Term termId="1">
        <Name xml:lang="en">Abstract</Name>
        </Term>
    <Term termId="2">
        <Name xml:lang="en">Adaptation</Name>
        </Term>
    <Term termId="3">
        <Name xml:lang="en">Adventure</Name>
```

```xml
</Term>
<Term termId="4">
    <Name xml:lang="en">Artificial Life</Name>
</Term>
<Term termId="5">
    <Name xml:lang="en">Board Games</Name>
</Term>
<Term termId="6">
    <Name xml:lang="en">Capturing</Name>
</Term>
<Term termId="7">
    <Name xml:lang="en">Card Games</Name>
</Term>
<Term termId="8">
    <Name xml:lang="en">Catching</Name>
</Term>
<Term termId="9">
    <Name xml:lang="en">Chase</Name>
</Term>
<Term termId="10">
    <Name xml:lang="en">Collecting</Name>
</Term>
<Term termId="11">
    <Name xml:lang="en">Combat</Name>
</Term>
<Term termId="12">
    <Name xml:lang="en">Demo</Name>
</Term>
<Term termId="13">
    <Name xml:lang="en">Diagnostic</Name>
</Term>
<Term termId="14">
    <Name xml:lang="en">Dodging</Name>
</Term>
<Term termId="15">
    <Name xml:lang="en">Driving</Name>
</Term>
<Term termId="16">
    <Name xml:lang="en">Educational</Name>
</Term>
<Term termId="17">
    <Name xml:lang="en">Escape</Name>
</Term>
<Term termId="18">
    <Name xml:lang="en">Fighting</Name>
</Term>
<Term termId="19">
    <Name xml:lang="en">Flying</Name>
</Term>
<Term termId="20">
    <Name xml:lang="en">Gambling</Name>
</Term>
<Term termId="21">
    <Name xml:lang="en"> Interactive Movie</Name>
</Term>
<Term termId="22">
    <Name xml:lang="en">Management Simulation</Name>
</Term>
<Term termId="23">
    <Name xml:lang="en">Maze</Name>
</Term>
<Term termId="24">
    <Name xml:lang="en">Obstacle Course</Name>
</Term>
<Term termId="25">
    <Name xml:lang="en">Pencil-and-Paper Games</Name>
</Term>
<Term termId="26">
    <Name xml:lang="en">Pinball</Name>
</Term>
<Term termId="27">
    <Name xml:lang="en">Platform</Name>
</Term>
<Term termId="28">
    <Name xml:lang="en">Programming Games</Name>
</Term>
<Term termId="29">
    <Name xml:lang="en">Puzzle</Name>
</Term>
<Term termId="30">
    <Name xml:lang="en">Quiz</Name>
</Term>
<Term termId="31">
    <Name xml:lang="en">Racing</Name>
</Term>
<Term termId="32">
    <Name xml:lang="en">Role-Playing</Name>
</Term>
<Term termId="33">
    <Name xml:lang="en">Rhythm and Dance</Name>
</Term>
<Term termId="34">
    <Name xml:lang="en">Shooter</Name>
</Term>
<Term termId="35">
    <Name xml:lang="en">Simulation</Name>
</Term>
<Term termId="36">
    <Name xml:lang="en">Sports</Name>
</Term>
<Term termId="37">
    <Name xml:lang="en">Strategy</Name>
</Term>
<Term termId="38">
    <Name xml:lang="en">Table-Top Games</Name>
</Term>
<Term termId="39">
    <Name xml:lang="en">Target</Name>
</Term>
<Term termId="40">
    <Name xml:lang="en">Text Adventure</Name>
</Term>
<Term termId="41">
    <Name xml:lang="en">Training Simulation</Name>
</Term>
<Term termId="42">
    <Name xml:lang="en">Utility</Name>
</Term>
</ClassificationScheme>
```

The 'Platform' has a game be able to be properly consumed by publishing what kind of user terminal, i.e., platform, a game provider targets on. The 'Game Platform CS', which is an XML expression of the platforms, describes diverse game platforms such as Personal Computer (PC), Personal Digital Assistance (PDA), Play Station, Xbox and Game boy (refer to the XML syntax of terminal type information (Terminal-Type), which will be described later, for the XML syntax of the 'Platform').

The 'Rate' means contents and age-appropriateness and the object of the 'Rate' is to provide information on a game. Parents and other consumers can properly select a game for their family by referring to the 'Rate', and there are many kinds of game rate institutions according to nations. For example, there are Entertainment Software Rating Board (ESRB) in the U.S.A., Computer Entertainment Rating Organization (CERO) in Japan, Pan European Game Indicator (PEGI) in Europe and Korea Media Rating Board (KMRB) in Korea. The following Table 3 presents rating system of some of the rate institutions.

TABLE 3

| ESRB | The ESRB rate | | EARLY CHILDHOOD (EC) |
|---|---|---|---|
| | has two parts. One part is a rate symbol in front side of a game box. It suggests an age-appropriateness. The other part | | Title rate EC includes contents for children older than 3, but does not include a subject matter which is determined to be improper by parents. TEEN (T) |

TABLE 3-continued

| | | | |
|---|---|---|---|
| | is a contents descriptor in the book of a game box. It means elements of the game which can induce a specific rate and/or draw interests. | | Title rate T includes contents for people older than 13 and can include violent contents, more or less provocative languages and/or indecent subject.<br>ADULTS ONLY (AO)<br><br>Title rate AO includes contents only for adults and the titles of the category can include graphic description of sex and/or violence. The AO Products are not intended for those under 18.<br>EVERYONE (E)<br><br>Title rate E includes contents for those older than 6. The titles of this category can include a minimum level of violence, partly comic play and/or a little provocative language.<br>MATURE (M)<br><br>Title rate M includes contents for those older than 17. The titles of this category can include mature sexual subject, fierce violence and/or harsh languages.<br>RATING PENDING (RP)<br><br>Titles rated RP are required to wait for final rate classification in the ESRB. |
| KMRB | The rate of domestic or foreign computer on-line mobile games and games to be provided to game providers | 18 years old<br>15 years old<br>12 years old<br>Everyone | Proper to those older than 18<br>Proper to those older than 15<br>Proper to those older than 12<br>Proper to those older than 6 |

As shown in the Table 3, the rate institutions generally classify games based on an age of viewers. Therefore, 'IntendedAudienceCS', which is pre-defined in the TVA-1, can be reused for the rate classification.

The 'Producer' is a game producer and the 'Developer' is a game developer. As described above, the 'Developer' can be a cut scene drawer, a sound generator, a three-dimensional (3D) engine engineer, a sound engine engineer and a package designer.

The 'NbMaxSimPlayers' shows the maximum number of players who access to a game in a history, and the maximum number shows how popular the game is.

The 'Difficulty' shows how difficult the game is. The rate of the 'Difficulty' is divided into hard, moderately hard, medium hard and easy.

The 'LearningCurve' shows how much time it takes to learning a game. It can be easily described by using "mpeg7: mediaDurationType".

The 'BestScores' shows a list and a score of players in an upper layer.

The 'Cheatcodes' shows a command for easily clearing and operating a game such as "show me the money" and "black sheep wall" of the 'StarCraft' game.

The 'PatchApplication' shows an application for updating a game or fixing a bug in a game. The 'PatchApplication' can be described by using an element from 'ApplicationContentModeObjectDescription' of TVA and a link from the game to the 'PatchApplication' is provided.

Figure 7:
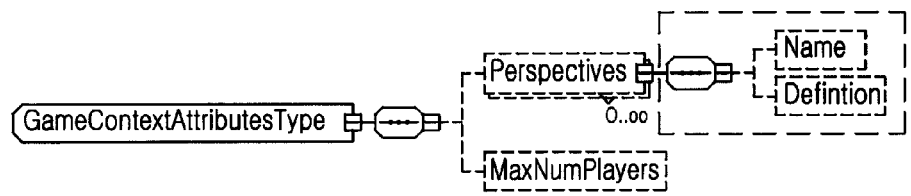
FIGS. 7 and 8 show game description metadata in accordance with a second embodiment of the present invention.
Figure 8:
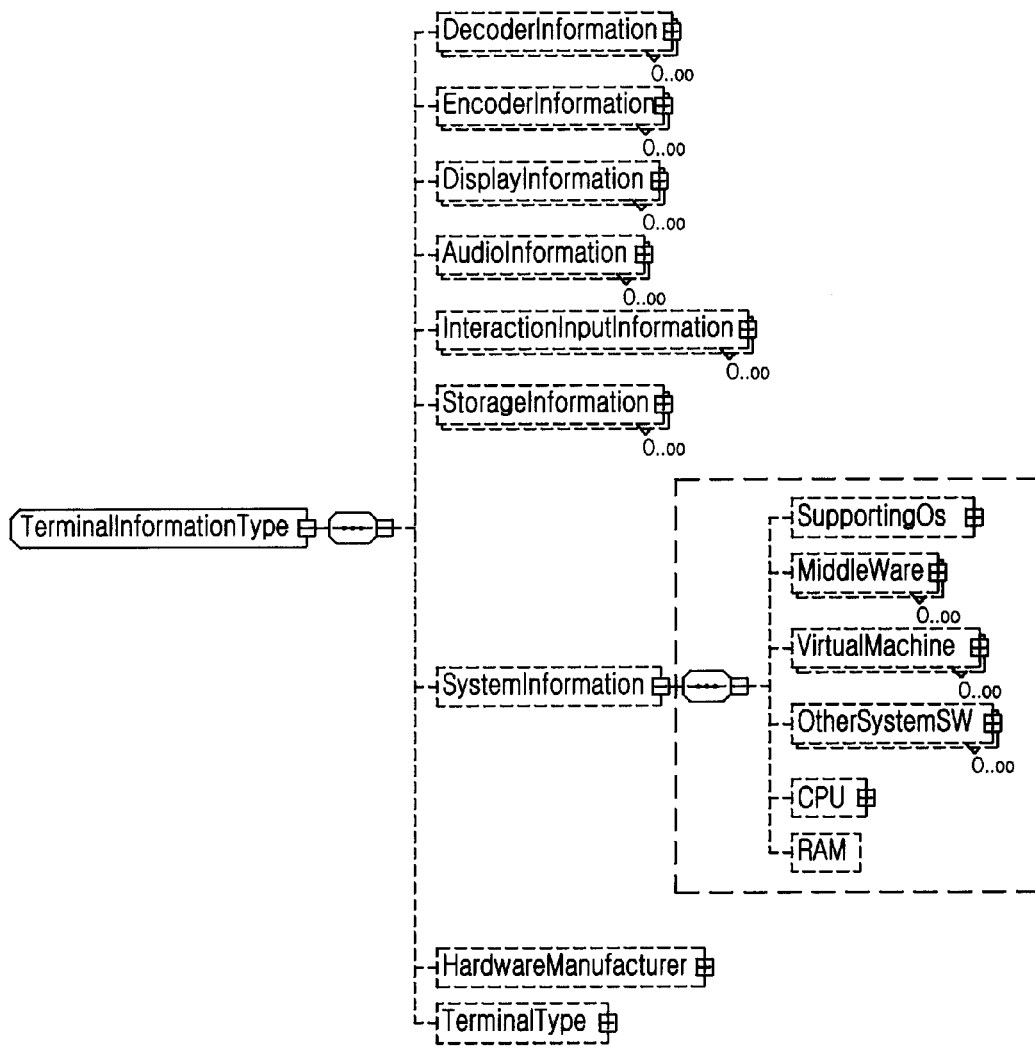

FIGS. 7 and 8 show game description metadata in accordance with a second embodiment of the present invention.

As shown in FIGS. 7 and 8, the second embodiment of the game description metadata of the present invention is dividedly used as 'GameContextAttributes' Type, which includes 'Perspectives' and 'MaxNumPlayers' informations, and 'TerminalInformation Type' for describing an environment of the user terminal, in which game contents are consumed.

The Perspectives information of the 'GameContextAttributes Type' shown in FIG. 7 is the same as the 'Perspectives' of the above-mentioned first embodiment, and the 'MaxNumPlayers' information is the same as 'NbMaxPlayers' of the above-mentioned first embodiment.

As shown in FIG. 8, the 'TerminalInformation Type' includes 'DecorderInformation', 'EncoderInformation', 'DisplayInformation', 'AudioInformation', 'InteractionInformation', 'StorageInformation', 'SystemInformation', 'HardwareManufacturer' and 'TerminalType'.

The 'SystemInformation' includes 'SuppportingOS', 'MiddleWare', 'VirtualMachin', 'OtherSystemSW', Central Processing Unit (CPU) information and Random-Access Memory (RAM) information.

Herein, the 'SuppportingOS' of the 'SystemInformation' is the same as the 'SupportingOS' of the above-mentioned first embodiment and the CPU is the same as the 'CPUCapability' of the above-mentioned first embodiment. The 'VirtualMachine' is also the same as the 'VirtualMachine' of the first embodiment.

Also, the 'OtherSystemSW' of the 'SystemInformation' is described as the following XML syntax by including contents of Prerequisite of the above-mentioned first embodiment.

```
<xml version="1.0" encoding="UTF-8">
<ClassificationScheme
 uri="urn:tva:metadata:extended:cs:OtherSystemSoftwareCS:2005">
<!--###############################################-->
<!--OtherSystemSoftwareCS -->
<!--Definition: This is a set of terms used within Content Packaging to
indicate -->
<!-- what kind of system softwares are needed in the Terminal written
by HeeKyung Lee     -->
<!--###############################################-->
    <Term termID="1">
        <Name xml:lang="en">Graphic library</Name>
        <Term termID="1.1">
            <Name xml:lang="en">DirectX</Name>
            <Term termID="1.1.1">
                <Name xml:lang="en">DirectX8.0</Name>
            </Term>
            <Term termID="1.1.2">
                <Name xml:lang="en">DirectX8.1</Name>
            </Term>
            <Term termID="1.1.3">
                <Name xml:lang="en">DirectX9.0</Name>
            </Term>
        </Term>
        <Term termID="1.2">
            <Name xml:lang="en">OpenGL</Name>
        </Term>
    </Term>
    <Term termID="2">
        <Name xml:lang="en">Media</Name>
        <Term termID="2.1">
            <Name xml:lang="en">mpeg-1 codec</Name>
        </Term>
        <Term termID="2.2">
```

```
        <Name xml:lang="en">mpeg-2 codec</Name>
    </Term>
    <Term termID="2.3">
        <Name xml:lang="en">real audio codec</Name>
    </Term>
    <Term termID="2.4">
        <Name xml:lang="en">quicktime format codec</Name>
    </Term>
    <Term termID="2.5">
        <Name xml:lang="en">windows media player</Name>
    </Term>
    <Term termID="2.6">
        <Name xml:lang="en">flash</Name>
    </Term>
</Term>
<Term termID="3">
    <Name xml:lang="en">DB</Name>
    <Term termID="3.1">
        <Name xml:lang="en">JDBC</Name>
    </Term>
    <Term termID="3.2">
        <Name xml:lang="en">Firebird/InterBase</Name>
    </Term>
    <Term termID="3.3">
        <Name xml:lang="en">Microsoft SQL Server</Name>
    </Term>
    <Term termID="3.4">
        <Name xml:lang="en">MySQL</Name>
    </Term>
    <Term termID="3.5">
        <Name xml:lang="en">Oracle</Name>
    </Term>
    <Term termID="3.6">
        <Name xml:lang="en">Other network-based DBMS</Name>
    </Term>
    <Term termID="3.7">
        <Name xml:lang="en">PostgreSQL</Name>
    </Term>
</Term>
<Term termID="4">
    <Name xml:lang="en">GUI Library</Name>
    <Term termID="4.1">
        <Name xml:lang="en">Amulet</Name>
    </Term>
    <Term termID="4.2">
        <Name xml:lang="en">FLTK</Name>
    </Term>
    <Term termID="4.3">
        <Name xml:lang="en">GTK</Name>
    </Term>
    <Term termID="4.4">
        <Name xml:lang="en">MFC</Name>
    </Term>
    <Term termID="4.5">
        <Name xml:lang="en">Morphic</Name>
    </Term>
    <Term termID="4.6">
        <Name xml:lang="en">Motif</Name>
    </Term>
    <Term termID="4.7">
        <Name xml:lang="en">Python</Name>
    </Term>
    <Term termID="4.8">
        <Name xml:lang="en">Qt</Name>
    </Term>
    <Term termID="4.9">
        <Name xml:lang="en">wxWindows </Name>
    </Term>
</Term>
<Term termID="5">
    <Name xml:lang="en">Mobile</Name>
    <Term termID="5.1">
        <Name xml:lang="en">ActiveSync</Name>
    </Term>
    <Term termID="5.2">
        <Name xml:lang="en">.Net Framework</Name>
    </Term>
    <Term termID="5.3">
        <Name xml:lang="en">DioPen V5.0</Name>
    </Term>
</Term>
</ClassificationScheme>
```

The 'TerminalType' of the 'SystemInformation' includes the Platform of the above-mentioned first embodiment, and an XML syntax is as follows:

```
<xml version="1.0" encoding="UTF-8">
<ClassificationScheme
 uri="urn:tva:metadata:extended:cs:TerminalTypeCS:2005">
    <Term termId="1">
        <Name xml:lang="en">PC</Name>
    </Term>
    <Term termId="2">
        <Name xml:lang="en">PDA</Name>
    </Term>
    <Term termId="3">
        <Name xml:lang="en">Set-Top Box</Name>
        <Term termId="3.1">
            <Name xml:lang="en">PDR</Name>
        </Term>
        <Term termId="3.2">
            <Name xml:lang="en">NDR</Name>
        </Term>
        <Term termId="3.3">
            <Name xml:lang="en">Cable Set-Top Box</Name>
        </Term>
        <Term termId="3.4">
            <Name xml:lang="en">Other Set-Top Box</Name>
        </Term>
    </Term>
    <Term termId="4">
        <Name xml:lang="en">Printer</Name>
    </Term>
    <Term termId="5">
        <Name xml:lang="en">Mobile Phone</Name>
    </Term>
    <Term termId="6">
        <Name xml:lang="en">Digital Still Camera</Name>
    </Term>
    <Term termId="7">
        <Name xml:lang="en">Digital Video Camera</Name>
    </Term>
    <Term termId="8">
        <Name xml:lang="en">Audio Player</Name>
    </Term>
    <Term termId="9">
        <Name xml:lang="en">Television</Name>
    </Term>
    <Term termId="10">
        <Name xml:lang="en">Gateway</Name>
    </Term>
    <Term termId="11">
        <Name xml:lang="en">Router</Name>
    </Term>
    <Term termId="12">
        <Name xml:lang="en">Car Terminal</Name>
        <Term termId="12.1">
            <Name xml:lang="en">Car Stereo</Name>
        </Term>
        <Term termId="12.2">
            <Name xml:lang="en">Car Navigation</Name>
        </Term>
        <Term termId="12.3">
            <Name xml:lang="en">Car AV</Name>
        </Term>
    </Term>
    <Term termId="13">
        <Name xml:lang="en">Game Platform</Name>
        <Term termID="13.1">
            <Name xml:lang="en">3DO</Name>
        </Term>
        <Term termID="13.2">
            <Name xml:lang="en">Amiga</Name>
        </Term>
        <Term termID="13.3">
```

```
            <Name xml:lang="en">Apple II</Name>
         </Term>
         <Term termID="13.4">
            <Name xml:lang="en">Atari</Name>
            <Term termID="13.4.1">
               <Name xml:lang="en">2600</Name>
            </Term>
            <Term termID="13.4.2">
               <Name xml:lang="en">5200</Name>
            </Term>
            <Term termID="13.4.3">
               <Name xml:lang="en">7800</Name>
            </Term>
            <Term termID="13.4.4">
               <Name xml:lang="en">ST</Name>
            </Term>
         </Term>
         <Term termID="13.5">
            <Name xml:lang="en">ColecoVision</Name>
         </Term>
         <Term termID="13.6">
            <Name xml:lang="en">Commodore 64</Name>
         </Term>
         <Term termID="13.7">
            <Name xml:lang="en">Dreamcast</Name>
         </Term>
         <Term termID="13.8">
            <Name xml:lang="en">Game Boy</Name>
            <Term termID="13.8.1">
               <Name xml:lang="en">Usual</Name>
            </Term>
            <Term termID="13.8.2">
               <Name xml:lang="en">Advance</Name>
            </Term>
            <Term termID="13.8.3">
               <Name xml:lang="en">Color</Name>
            </Term>
         </Term>
         <Term termID="13.9">
            <Name xml:lang="en">Game Cube</Name>
         </Term>
         <Term termID="13.10">
            <Name xml:lang="en">Game Gear</Name>
         </Term>
         <Term termID="13.11">
            <Name xml:lang="en">Genesis</Name>
         </Term>
         <Term termID="13.12">
            <Name xml:lang="en">Intellivision</Name>
         </Term>
         <Term termID="13.13">
            <Name xml:lang="en">Jaguar</Name>
         </Term>
         <Term termID="13.14">
            <Name xml:lang="en">Lynx</Name>
         </Term>
         <Term termID="13.15">
            <Name xml:lang="en">NES</Name>
         </Term>
         <Term termID="13.16">
            <Name xml:lang="en">N-Gage</Name>
         </Term>
         <Term termID="13.17">
            <Name xml:lang="en">Nintendo</Name>
            <Term termID="13.17.1">
               <Name xml:lang="en">64</Name>
            </Term>
            <Term termID="13.17.2">
               <Name xml:lang="en">DS</Name>
            </Term>
         </Term>
         <Term termID="13.18">
            <Name xml:lang="en">PC Booter</Name>
         </Term>
         <Term termID="13.19">
            <Name xml:lang="en">PlayStation</Name>
            <Term termID="13.19.1">
               <Name xml:lang="en">Usual</Name>
            </Term>
            <Term termID="13.19.2">
               <Name xml:lang="en">2</Name>
            </Term>
         </Term>
         <Term termID="13.20">
            <Name xml:lang="en">PSP</Name>
         </Term>
         <Term termID="13.21">
            <Name xml:lang="en">Saturn</Name>
         </Term>
         <Term termID="13.22">
            <Name xml:lang="en">Sega</Name>
            <Term termID="13.22.1">
               <Name xml:lang="en">32X</Name>
            </Term>
            <Term termID="13.22.2">
               <Name xml:lang="en">CD</Name>
            </Term>
            <Term termID="13.22.3">
               <Name xml:lang="en">Master System</Name>
            </Term>
         </Term>
         <Term termID="13.23">
            <Name xml:lang="en">SNES</Name>
         </Term>
         <Term termID="13.24">
            <Name xml:lang="en">TI-99/4</Name>
         </Term>
         <Term termID="13.25">
            <Name xml:lang="en">TurboGrafx</Name>
            <Term termID="13.25.1">
               <Name xml:lang="en">16</Name>
            </Term>
            <Term termID="13.25.2">
               <Name xml:lang="en">CD</Name>
            </Term>
         </Term>
         <Term termID="13.26">
            <Name xml:lang="en">Vectrex</Name>
         </Term>
         <Term termID="13.27">
            <Name xml:lang="en">VIC-20</Name>
         </Term>
         <Term termID="13.28">
            <Name xml:lang="en">Virtual Boy</Name>
         </Term>
         <Term termID="13.29">
            <Name xml:lang="en">V.Smile</Name>
         </Term>
         <Term termID="13.30">
            <Name xml:lang="en">Xbox</Name>
         </Term>
         <Term termID="13.31">
            <Name xml:lang="en">ZX Spectrum</Name>
         </Term>
      </Term>
      <Term termId="14">
         <Name xml:lang="en">Home Server</Name>
         <Term termId="14.1">
            <Name xml:lang="en">Media Server</Name>
         </Term>
         <Term termId="14.2">
            <Name xml:lang="en">Refrigerator HS</Name>
         </Term>
         <Term termId="14.3">
            <Name xml:lang="en">Game machine HS</Name>
         </Term>
      </Term>
</ClassificationScheme>
```

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The technology of the present invention is applies to a TV-Anytime (TVA) system.

What is claimed is:

1. An adaptive broadcasting service providing apparatus for providing adaptive broadcasting contents including video game contents to a user terminal, comprising:
    a processor;
    a contents creating unit for generating game metadata from the adaptive broadcasting contents; and
    a contents displaying unit for providing the adaptive broadcasting contents and the game metadata,
    wherein the game metadata describe characteristics of the video game contents,
    wherein the game metadata includes perspectives information for describing information on a role or a viewpoint of a user progressing game,
    wherein the perspectives information include:
        top-down information for displaying a main configuration of a game play by top-down view; and
        isometric perspectives information which is described in an isometric view such that a game of a two-dimensional (2D) play field can be seen as a game of three-dimensional (3D).

2. The apparatus as recited in claim 1, wherein the game metadata includes the number information of players which describe the number of users who can access to the game.

3. The apparatus as recited in claim 2, wherein the perspectives information includes:
    first-person perspectives information for showing display information based on a viewpoint of the user; and
    third-person perspectives information for showing display information that a user can see himself.

4. The apparatus as recited in claim 2, wherein the number of users is a maximum number of users who can access to the game.

5. The apparatus as recited in claim 1, wherein the perspectives information further includes:
    text-based game information for describing display information of a game which does not use a graphic.

6. The apparatus as recited in claim 1, wherein the perspectives information further includes flat/side view information, and the flat/side view information includes:
    side scroller information for describing a game in which a game player horizontally moves from one side of the play field to the other side; and
    platform information for describing a game that the play field is set up based on a series of floor, level or platform with respect to the player.

7. The apparatus as recited in claim 1, wherein the game metadata are user information metadata for describing an environment of a user terminal in which the game is consumed.

8. The apparatus as recited in claim 7, wherein the user information metadata include:
    operation system information for describing a kind of operation system in which the game can be consumed;
    process information for describing process capacity for operation of the game; and
    system software information for describing an application required in advance for game consumption.

9. The apparatus as recited in claim 8, wherein the user information metadata further include:
    virtual machine information for describing a kind of a virtual machine of the user terminal in which the game can be consumed.

10. The apparatus as recited in claim 7, wherein the user information metadata further include:
    terminal type information for describing platform information of the user terminal on which a game targets.

11. The apparatus as recited in claim 1, wherein the contents providing means generates only a package including a game when the package is independent from a program, and generates a package including an audio/video (AV) program and a game when the package is dependent on the program.

12. The apparatus as recited in claim 1, further comprising:
    a contents searching unit for providing contents identification information corresponding to a search and selection signal inputted from the user terminal; and
    a location resolution unit for determining and providing a physical location of a content including a channel and broadcasting time from the contents identification information.

13. The apparatus as recited in claim 12, wherein the user terminal receives physical location information of a component corresponding to the contents identification information from the location resolution unit, and acquires the component from the location.

14. The apparatus as recited in claim 13, wherein the acquired components are provided to a screen based on spatial/temporal relationship information between components.

15. The apparatus as recited in claim 13, wherein the user terminal stores and uses package watching history information of the user for preference extraction information.

16. An adaptive broadcasting service providing apparatus for providing adaptive broadcasting contents including video game contents to a user terminal, comprising:
    a processor;
    a contents creating unit for generating game metadata from the adaptive broadcasting contents; and
    a contents displaying unit for providing the adaptive broadcasting contents and the metadata,
    wherein the game metadata include:
    common description metadata for describing common characteristics of the broadcasting contents; and
    game description metadata for describing a characteristic of the video game content,
    wherein the game description metadata includes perspectives information for describing information on a role or a viewpoint of a user progressing a game,
    wherein the perspectives information further include:
        top-down information for displaying a main setup of a game play by a top-down view;
        isometric perspectives information which is described as an isometric view such that a game of a two-dimensional (2D) play field can be seen as a game of three-dimensional (3D); and
        text-based game information for describing display information of a game which does not use a graphic.

17. The apparatus as recited in claim 16, wherein the common description metadata include a title, a media title, a synopsis, a language, a production date and price information.

18. The apparatus as recited in claim 16, wherein the common description metadata use 'BasicContentDescriptionType' metadata of TV-Anytime 1 (TVA1).

19. The apparatus as recited in claim 16, wherein the game description metadata includes the number information of players which show the number of users who can access to the game.

20. The apparatus as recited in claim 19, wherein the perspectives information includes:
 first-person perspectives information for showing display information based on a viewpoint of the user; and
 third-person perspectives information for showing display information that a user can see himself.

21. The apparatus as recited in claim 16, wherein the perspectives information further includes flat/side view information, and the flat/side view information includes:
 side scroller information for describing a game in which a game player moves from one side of the play field to the other side horizontally; and
 platform information for describing a game that the play field is set up based on a series of floor, level and platform with respect to the player.

22. The apparatus as recited in claim 16, wherein the metadata are user information metadata for describing an environment of a user terminal in which the game is consumed.

23. The apparatus as recited in claim 22, wherein the user information metadata include:
 operation system information for describing a kind of operation system in which the game can be consumed;
 process information for describing process capacity for operation of the game; and
 system software information for describing an application required in advance for game consumption.

24. The apparatus as recited in claim 23, wherein the user information metadata further include:
 virtual machine information for describing a kind of virtual machine of the user terminal in which the game can be consumed.

25. The apparatus as recited in claim 23, wherein the user information metadata further include:
 terminal type information for describing platform information of the user terminal on which a game targets.

26. A computerized adaptive broadcasting service providing method for providing adaptive broadcasting contents including video game contents to a user terminal, comprising:
 a) generating by a processor game metadata from the adaptive broadcasting contents;
 b) providing the adaptive broadcasting contents and the game metadata wherein the game metadata describe characteristics of the video game contents;
 c) providing contents identification information corresponding to a search and selection signal inputted from the user terminal; and
 d) determining and providing a physical location of a content including a channel and broadcasting time from the contents identification information.

27. The method as recited in claim 26, wherein the game metadata include:
 perspectives information for describing information on a role or a viewpoint of a user progressing a game; and
 the number information of players for showing the maximum number of users who can access to the game.

28. The method as recited in claim 27, wherein the perspectives information includes:
 first-person perspectives information for showing display information based on a viewpoint of the user; and
 third-person perspectives information for showing display information that a user can see himself.

29. A computerized adaptive broadcasting service providing method for providing adaptive broadcasting contents including game contents to a user terminal, comprising:
 a) generating by a processor game metadata from the adaptive broadcasting contents; and
 b) providing the adaptive broadcasting contents and the game metadata wherein the game metadata describe characteristics of the game contents,
 wherein the game metadata include:
  perspectives information for describing information on a role or a viewpoint of a user progressing a game; and
  the number information of players for showing the maximum number of users who can access to the game,
 wherein the perspectives information includes:
  first-person perspectives information for showing display information based on a viewpoint of the user; and
  third-person perspectives information for showing display information that a user can see himself,
 wherein the perspectives information further includes:
  top-down information for displaying a main configuration of a game play by top-down view;
  isometric perspectives information which is described in an isometric view such that a game of a two-dimensional (2D) play field can be seen in three-dimensional (3D);
  text-based game information for describing display information of a game which does not use a graphic;
  side scroller information for describing a game in which a game player horizontally moves from one side of the play field to the other side; and
  platform information for describing a game that the play field is set up based on a series of floor, level and platform with respect to the player.

30. The method as recited in claim 26, wherein the game metadata include user information metadata for describing an environment of a user terminal in which the game is consumed.

31. The method as recited in claim 30, wherein the user information metadata include:
 operation system information for describing a kind of an operation system in which the game can be consumed;
 process information for describing process capacity for operation of the game;
 system software information for describing an application required in advance for game consumption; and
 virtual machine information for describing a kind of virtual machine of the user terminal in which the game can be consumed.

32. The method as recited in claim 31, wherein the user information metadata further include:
 terminal type information for describing platform information of the user terminal on which the game targets.

33. A user terminal for receiving broadcasting contents including video game contents, comprising:
 a processor;
 a user interaction unit for searching, selecting and acquiring the video game contents based on game metadata for the video game contents which are published by an adaptive broadcasting service providing apparatus; and
 a contents displaying unit for displaying the acquired video game contents to the user,
 wherein the game metadata describe characteristics of the video game contents;
 wherein the user interacting unit receives physical location information of the game contents corresponding to the contents identification information from the adaptive broadcasting service providing apparatus, and acquires the game contents from the location.

34. The terminal as recited in claim 33 wherein the contents displaying unit provides a screen organized based on spatial/temporal relationship information between components of the acquired game contents.

35. The terminal as recited in claim 33, further comprising:
a local storage managing unit for storing and managing the acquired game contents and the game metadata,
wherein the local storage managing unit stores and uses package watching history information of the game contents in preference extraction information of the user.

36. The terminal as recited in claim 33, wherein the game metadata include:
perspectives information for describing information on a role or a viewpoint of a user progressing a game; and
the number information of players for showing the number of users who can access to the game.

37. The terminal as recited in claim 33, wherein the game metadata are user information metadata for describing an environment of a user terminal in which the game is consumed.

38. The terminal as recited in claim 37, wherein the user information metadata include:
operation system information for describing a kind of operation system in which the game can be consumed;
process information for describing process capacity for operation of the game;
system software information for describing an application required in advance for game consumption; and
virtual machine information for describing a kind of virtual machine of the user terminal in which the game can be consumed.

39. The terminal as recited in claim 38, wherein the user information metadata further include:
terminal type information for describing platform information of the user terminal on which a game targets.

40. An adaptive broadcasting system for providing broadcasting contents including video game contents to a user terminal, comprising:
an adaptive broadcasting service providing apparatus for generating game metadata for the video game contents and providing broadcasting contents and the game metadata;
a user terminal receiving and consuming the broadcasting contents including the video game contents and game metadata from the adaptive broadcasting service providing apparatus;
a contents searching unit for proving contents identification information corresponding to a search and selection signal inputted from the user terminal; and
a location resolution unit for determining and providing a physical location of a content including a channel and broadcasting time from the contents identification information,
wherein the game metadata describe characteristics of the video game contents.

41. The system as recited in claim 40, wherein the adaptive broadcasting service providing apparatus includes:
a broadcasting contents generating unit for generating the adaptive broadcasting contents; and
a contents providing unit for providing the adaptive broadcasting contents and the game metadata.

42. The system as recited in claim 40, wherein the user terminal includes:
a user interacting unit for searching, selecting and acquiring the game contents based on the game metadata for the game contents that are published by the adaptive broadcasting service providing apparatus; and
a contents displaying unit for displaying the acquired game contents to the user, wherein the game metadata describe characteristics of the game contents.

43. The system as recited in claim 40, wherein the game metadata include:
perspectives information for describing information on a role or a viewpoint of a user progressing a game; and
the number information of players for showing the number of users who can access to the game.

44. The system as recited in claim 40, wherein the game metadata are user information metadata for describing an environment of a user terminal in which the game is consumed.

45. An adaptive broadcasting system for providing broadcasting contents including game contents to a user terminal, comprising:
an adaptive broadcasting service providing apparatus for generating game metadata for the game contents and providing broadcasting contents and the game metadata; and
a user terminal receiving and consuming the broadcasting contents including the game contents and game metadata from the adaptive broadcasting service providing apparatus, wherein the game metadata describe characteristics of the game contents,
wherein the game metadata are user information metadata for describing an environment of a user terminal in which the game is consumed,
wherein the user information metadata include:
operation system information for describing a kind of operation system in which the game can be consumed;
process information for describing process capacity for operation of the game;
system software information for describing an application required in advance for game consumption;
virtual machine information for describing a kind of virtual machine of the user terminal in which the game can be consumed; and
terminal type information for describing platform information of the user terminal on which a game targets.

46. An adaptive broadcasting system for providing broadcasting contents including video game contents to a user terminal, comprising:
an adaptive broadcasting service providing apparatus for generating game metadata for the video game contents and providing broadcasting contents and the game metadata,
wherein the game metadata describe characteristics of the video game contents,
wherein the game metadata are user information metadata for describing an environment of a user terminal in which the game is consumed,
wherein the user information metadata include:
operation system information for describing a kind of operation system in which the game can be consumed;
process information for describing process capacity for operation of the game;
system software information for describing an application required in advance for game consumption;
virtual machine information for describing a kind of virtual machine of the user terminal in which the game can be consumed; and
terminal type information for describing platform information of the user terminal on which a game targets.

* * * * *